United States Patent [19]

Shimada et al.

[11] Patent Number: 5,662,972
[45] Date of Patent: Sep. 2, 1997

[54] TUBULAR LAMINATE AND PROCESS FOR PRODUCING THE SAME

[75] Inventors: Kazuhiko Shimada; Yutaka Nakata; Kenjiro Idemori, all of Settsu, Japan

[73] Assignee: Daikin Industries, Ltd., Osaka, Japan

[21] Appl. No.: 185,852

[22] PCT Filed: May 24, 1993

[86] PCT No.: PCT/JP93/00688

§ 371 Date: Jan. 25, 1994

§ 102(e) Date: Jan. 25, 1994

[87] PCT Pub. No.: WO93/24299

PCT Pub. Date: Dec. 9, 1993

[30] Foreign Application Priority Data

May 26, 1992 [JP] Japan .................................. 4-133492

[51] Int. Cl.$^6$ .............................. B29D 22/00; B32B 1/08
[52] U.S. Cl. ...................... 428/35.7; 428/35.9; 428/421; 428/422
[58] Field of Search .......................... 428/421, 422, 428/35.7, 35.9

[56] References Cited

U.S. PATENT DOCUMENTS 3,296,011  1/1967  McBride et al. ........................ 117/47
3,472,756  10/1969  Punderson ............................ 204/312

FOREIGN PATENT DOCUMENTS

| 0479592 | 4/1992 | European Pat. Off. . |
| 2082448 | 12/1971 | France . |
| 1290717 | 3/1969 | Germany . |
| 3302161 | 7/1984 | Germany . |
| 49-119166 | 11/1974 | Japan . |
| 60-3093 | 1/1985 | Japan . |
| 62-44420 | 2/1987 | Japan . |
| 1-146930 | 6/1989 | Japan . |

OTHER PUBLICATIONS

International Search Report in PCT/JP93/00688.
Supplementary European Search Report for Appln No. EP 93 91 0385 mailed May 27, 1994.

*Primary Examiner*—Helen Lee
*Attorney, Agent, or Firm*—Varndell Legal Group

[57] ABSTRACT

A process for producing a tubular laminate which comprises, discharge-treating an outer surface of a tubular fluorine-containing resin molded article in an inert gas atmosphere containing an organic compound having a functional group, extruding a molten resin onto the treated surface and coating the treated surface with the molten resin. According to this process, there can be obtained a strong adhesion between the fluorine-containing resin molded article and the coating resin without using an adhesive. Therefore, an applying step of the adhesive can be omitted and the tubular laminate can be produced continuously.

20 Claims, No Drawings

TUBULAR LAMINATE AND PROCESS FOR PRODUCING THE SAME

TECHNICAL FIELD

The present invention relates to a tubular laminate of a fluorine-containing resin a process for producing the same.

BACKGROUND ART

A fluorine-containing resin has excellent characteristics such as non-stickiness, stain resistance, heat resistance, chemical resistance, clearness, ultraviolet ray aging resistance, weatherability, and water and oil repelling property, which are not possessed by the other resins. However, the fluorine-containing resin is very difficult to be laminated on the other materials due to its non-sticking characteristic. Therefore, the fluorine-containing resin is not actually widely used in spite of the above-mentioned excellent characteristics. A tubular laminate is not an exception.

Effort to conduct lamination on a fluorine-containing resin molded article has been first directed to modification of a surface of the fluorine-containing resin molded article, and various modification methods have been developed. For example, there are known methods in which an electric discharge treatment such as corona discharge is conducted (JP-B-17485/1962, JP-B-51421/1984, JP-B-54848/1990, JP-A-214620/1984, JP-A-9533/1988, JP-A-218336/1988, JP-A-222838/1988), a method in which a flame treatment or a metallic sodium treatment is conducted (JP-B-10176/1988), a method in which surface roughing treatment is conducted by sand blast, and the like. In most cases, however, sufficient adhesion may not be obtained only by modifying the surface of the fluorine-containing resin. Therefore, an adhesive is used for lamination.

These methods are similarly applied to lamination of a tubular fluorine-containing resin molded article. JP-B-51421/1984 discloses a process for producing a tubular laminate in which after treating an outer surface of an inner layer of the fluorine-containing resin molded article by corona discharge, a rubber-based primer layer is formed on the treated surface, and an unvulcanized rubber sheet is wrapped on the primer layer, then vulcanization is conducted.

For forming the primer layer or the adhesive layer, however, more steps are necessary corresponding thereto. Further, various considerations are required for selection of the adhesive.

The present invention provides a process for producing a tubular fluorine-containing resin laminate without an adhesive layer (a primer layer) and having a strong adhesion to each other.

DISCLOSURE OF THE INVENTION

The present invention relates to a process for producing a tubular laminate which comprises, discharge-treating an outer surface of a tubular fluorine-containing resin molded article in an inert gas atmosphere containing an organic compound having a functional group, extruding a molten resin onto the treated surface, and coating the treated surface with the molten resin.

The preferred embodiments of the present invention are explained hereinbelow:

The fluorine-containing resin used in the present invention is not restricted, provided that a tubular molded article can be produced from the resin. Examples are polytetrafluoroethylene (PTFE) or a modified compound thereof, tetrafluoroethylene-perfluoroalkyl vinyl ether copolymer (PFA), tetrafluoroethylene-hexafluoro-propylene copolymer (FEP), tetrafluoroethylene-ethylene copolymer (ETFE), tetrafluoroethylene-vinylidene fluoride copolymer (TFE/VdF), tetrafluoroethylene-hexafluoro-propylene-perfluoroalkyl vinyl ether copolymer (EPA), polychlorotrifluoroethylene (PCTFE), chlorotrifluoro-ethylene-ethylene copolymer (ECTFE), chlorotrifluoro-ethylene-vinylidene fluoride copolymer (CTFE/VdF), poly(vinylidene fluoride) (PVdF), poly(vinyl fluoride) (PVF), and the like. Among them, PTFE, PFA, FEP, ETFE, PCTFE and PVdF are particularly preferable. The fluorine-containing resin molded article may be either a tubular article itself or a coated layer formed on other tubular substrates, for example, a metallic pipe made of steel, copper, aluminium or the like, a nonmetallic pipe made of glass, cement, resin or the like.

For the surface modification of the fluorine-containing resin molded article, there are adopted discharge treatments such as corona discharge treatment, glow discharge treatment, plasma discharge treatment and sputtering treatment (JP-B-17485/1962, JP-B-12900/1974, U.S. Pat. No. 3296011). For example, in the corona discharge treatment, the surface treatment is carried out by exposing a surface to be modified to an atmosphere of an inert gas (for example, nitrogen gas, helium gas, argon gas, or the like) containing an organic compound having a functional group, applying a high frequency voltage between electrodes to generate corona discharge, thereby producing active species on the surface, subsequentry introducing the functional group of the organic compound or graft-polymerizing a polymerizable organic compound. Conditions of the corona discharge may be properly selected according to a dielectric constant of the fluorine-containing resin molded article.

The feature of the present invention is that the organic compound having a functional group exists in the atmosphere on the discharge-treatment. The surface of the fluorine-containing resin modified by the discharge treatment has an increased surface activity, and an extremely enhanced reactivity. A surface tension after the modification is preferably not less than approximately 30 dyn/cm, particularly not less than approximately 40 dyn/cm.

Examples of the functional group are, for instance, hydroxyl group, epoxy group, carboxyl group, ester group, carbonyl group, isocyanate group, nitrile group, amino group, ether bond, polymerizable double bond, and the like. However, the functional group is not restricted to them. The compound having the functional group may be either a polymerizable compound or a non-polymerizable compound. Non-restricted examples are listed below.

(a) Compounds having hydroxyl group
   Polymerizable organic compounds:
     Polyhydric alcohols such as ethylene glycol and gricerol; and the like.
   Non-polymerizable organic compounds:
     Monohydric alcohols such as methanol, ethanol and phenol; and the like.

(b) Compounds having epoxy group
   Polymerizable organic compounds:
     Epoxydized compounds such as glycidyl methacrylate and epichlorohydrin; and the like.
   Non-polymerizable organic compounds:
     Glycidyl ethers, epoxy alkanes; and the like.

(c) Compounds having carboxyl group
   Polymerizable organic compounds:
     Dicarboxylic acids such as phtalic acid and maleic acid; acrylic acids such as acrylic acid and methacrylic acid; and the like.

Non-polymerizable organic compounds:

Carboxylic acids such as formic acid and acetic acid; and the like.

(d) Compounds having ester group

Polymerizable organic compounds:

Esters such as methyl acrylate, methyl methacrylate, ethyl acrylate, glycidyl methacrylate and diallyl phthalate; and the like.

Non-polymerizable organic compounds:

Esters such as ethyl formate and ethyl acetate; and the like.

(e) Compounds having carbonyl group

Polymerizable organic compounds:

The carbonyl group in the carboxylic acids or the esters of (c) and (d).

Non-polymerizable organic compounds:

Ketones such as acetone (carbonyl group in monofunctional carboxylic acids and esters).

(f) Compounds having isocyanate group

Isocyanates such as tolylenediisocyanate and its derivatives.

(g) Compounds having nitrile group

Polymerizable organic compounds:

Acrylonitriles such as acrylonitrile and methacrylonitrile; cyanoacrylates; and the like.

Non-polymerizable organic compounds:

Nitriles such as acetonitrile and propionitrile; and the like.

(h) Compounds having amino group

Polymerizable organic compounds:

Melamines; diamines; acrylamides; and the like.

Non-polymerizable organic compounds:

Various amines and ammonium salts; and the like.

(i) Compounds having ether bond

Polymerizable organic compounds:

Vinyl ethers such as vinyl methyl ether and vinyl ethyl ether; and the like.

Non-polymerizable organic compounds:

Various ethers such as diethyl ether and glycidyl methyl ether; or the like.

(j) Compounds having polymerizable double bond

Olefines such as ethylene and propylene; vinyl carboxylates such as vinyl acetate; perhalogenated olefins such as chlorotrifluoroethylene, tetrafluoroethylene and hexafluoropropylene; or the like.

The organic compound is required to be present in gaseous (steam) state in the inert gas atmosphere. The concentration varies with kinds of the organic compound, and is usually 0.1 to 10.0% by mole, preferably 0.5 to 7.0% by mole. Therefore, the organic compound necessarily has a vapor pressure of at least not less than 1 mmHg at the discharge treatment temperature (usually from 20° to 100° C.). In case of the polymerizable organic compound, it is particularly preferable to combine with a coating resin comprising a polymer obtained by polymerization or copolymerization of the polymerizable organic compound. In case of the non-polymerizable organic compound, it is required to have at least one active hydrogen or to be a compound having a bond dissociation energy of not more than 100 kcal, since the non-polymerizable organic compound has to be activated by the discharge treatment.

In the present invention, the coating layer is formed by melt-extruding the coating resin directly on the thus surface-modified tubular fluorine-containing resin molded article. The preferable coating resin has a lower melting temperature than that of the fluorine-containing resin of the inner resin, an excellent wettability with the surface treated fluorine-containing resin molded article, and a surface tension of not less than 30 dyn/cm. When the surface tension is less than that, since the wettability is worse, adhesion is not good.

The preferable coating resins are, for example, polyamides such as nylon 12, nylon 11, nylon 6 and nylon 66; polyolefins such as polyvinylchloride (PVC); poly(vinyl acetate), poly(methyl methacrylate), polyacrylonitrile, polyethyleneterephthalate, polyurethane, and the like. Among them, particularly preferable is a polymer obtained by polymerization or copolymerization of a monomer which has the same functional group as or a functional group having an affinity with the functional group of the organic compound present in the atmosphere for modification, because the polymer has an improved adhesion. A polymer which has a good excellent wettability with the modified surface provides a sufficient adhesion.

Into the coating resin, there may be blended usual additives, for example, curing agents, ultraviolet ray absorbents, fillers, pigments, antistatic agents, plasticizers, and the like.

As an extrusion-coating method, there may be employed a method similar to a usual electric cable coating method. For example, there is a method which comprises, discharge-treating an outer surface of a tubular fluorine-containing resin molded article laminated on a mandrel made of resin or metal in an inert gas atmosphere which contains the organic compound having a functional group, subsequently extruding a coating resin continuously through a crosshead of an extruder, and then coating the outer surface with the resin. The extrusion-coating method is not limited to this method.

According to the present invention, there can be continuously produced a tubular laminate made of different kinds of resins with strong adhesion therebetween without using an adhesive.

BEST MODE FOR CARRYING OUT THE INVENTION

The present invention is explained by means of the following Examples. The present invention is not limited only to the Examples.

EXAMPLE 1

A tubular molded article (outer diameter 6.0 mmø, thickness 0.2 mm) made of ETFE (melting temperature 260° C.) was discharge-treated in a nitrogen gas atmosphere containing 7% by mole of vinyl acetate vapor under a charge density of 3 W/cm$^2$ to obtain a tubular molded article of which outer surface was modified with vinyl acetate (surface tension after modification 45 dyn/cm).

Onto the surface modified tubular fluorine-containing resin molded article was extruded a molten nylon 12 (melting temperature 180° C., surface tension 36 dyn/cm) heated at 220° C. to form a coating layer having a thickness of 1.0 mm.

When peel strength of the resulting laminate was measured according to the following method, the peel strength was 3.0 kgf/inch. (Peel strength)

A universal tension meter (Tensiron available from Orientech Kabushiki Kaisha) was used to carry out 180° peel. Stretching rate was 100 mm/min.

EXAMPLES 2 to 6

Tubular fluorine-containing resin molded articles were discharge-treated under the conditions shown in Table 1 according to the method of Example 1 to modify their surfaces. The coating resins shown in Table 1 were melt-extruded to obtain tubular laminates, and the peel strengths were measured. The results are shown in Table 1.

Comparative Example 1

A molten resin (nylon 12) is extruded to obtain a tubular laminate coated herewith in the same manner as in Example 1 except that the surface treatment was not carried out. The peel strength was not more than 0.1 kgf/inch.

Comparative Example 2

The surface modification was carried out and a molten resin (nylon 12 ) was extruded to obtain a tubular laminate coated therewith in the same manner as in Example 1 except that the discharge treatment was conducted in the absence of vinyl acetate. The peel strength was 0.5 kgf/inch.

Comparative Example 3

A coating resin Was extruded to obtain a tubular laminate coated therewith in the same manner as in Example 1 except that polypropylene was used instead of nylon 12 as the coating resin. The peel strength was 0.2 kgf/inch.

Each abbreviation used in Tables 1 to 3 has the following meaning.

(Fluorine-containing resin)

FEP: Tetrafluoroethylene-hexafluoropropylene copolymer.

ETFE: Tetrafluoroethylene-ethylene copolymer

PFA: Tetrafluoroethylene-perfluoroalkyl vinyl ether copolymer (Organic compound)

VAc: Vinyl acetate

GMA: Glycidyl methacrylate (Coating resin)

PU: Polyurethane elastomer

PE: Polyethylene

PP: Polypropylene

INDUSTRIAL APPLICABILITY

According to the present invention, there can be obtained a strong adhesion between the tubular fluorine-containing resin molded article and the coating resin without using an adhesive. Therefore, an applying step of the adhesive can be omitted as well as the tubular laminate can be produced continuously.

We claim:

1. A process for producing a tubular laminate which comprises, discharge-treating an outer surface of a tubular fluorine-containing resin molded article in an inert gas atmosphere containing an organic compound having a functional group, extruding a molten resin onto the treated surface, and coating the treated surface with the molten resin, the coating resin having a melting point lower than an inner layer of the fluorine-containing resin and a surface tension of not less than 30 dyn/cm.

2. The process of claim 1, wherein the functional group of the organic compound is hydroxyl group, epoxy group, carboxyl group, ester group, carbonyl group, isocyanate group, nitrile group, amino group, ether bond or polymerizable double bond.

3. The process of claim 1, wherein the fluorine-containing resin is polytetrafluoroethylene, tetrafluoroethylene-perfluoroalkyl vinyl ether copolymer, tetrafluoroethylene-hexafluoropropylene copolymer, tetrafluoroethylene-ethylene copolymer, polychlorotrifluoroethylene or poly (vinylidene fluoride).

4. A tubular laminate having a resin coating layer on a tubular fluorine-containing resin molded article, obtained by discharge-treating an outer surface of the tubular fluorine-containing resin molded article in an inert gas atmosphere containing an organic compound having a functional group, extruding a molten resin onto the treated surface, and coating the treated surface with the molten resin, the coating resin having a melting point lower than an inner layer of the fluorine-containing resin and a surface tension of not less than 30 dyn/cm.

5. The tubular laminate of claim 4, wherein the functional group of the organic compound is hydroxyl group, epoxy group, carboxyl group, ester group, carbonyl group, isocy-

TABLE 1

| Example | Material of tubular molded article (melting point °C.) | Discharge-treatment atmosphere (% by mole) | Surface tension of molded article after modification (dyn/cm) | Coating resin Kind (melting point °C.) | Coating resin Surface tension (dyn/cm) | Peel strength (kgf/inch) |
|---|---|---|---|---|---|---|
| 1 | ETFE (260) | N$_2$/VAc (7) | 45 | Nylon 12 (180) | 36 | 3.0 |
| 2 | FEP (270) | The same as above | 43 | Nylon 12 | 36 | 2.5 |
| 3 | PFA (310) | The same as above | 42 | Nylon 12 | 36 | 2.2 |
| 4 | ETFE | N$_2$/GMA (7) | 47 | Nylon 11 (190) | 38 | 3.3 |
| 5 | ETFE | N$_2$/VAc (7) | 45 | PU (150) | 39 | 2.8 |
| 6 | ETFE | The same as above | 45 | PET (235) | 45 | 3.1 |
| Comparative Example 1 | ETFE | No treatment | 22 | Nylon 12 | 36 | ≦0.1 |
| Comparative Example 2 | ETFE | N$_2$ alone | 25 | Nylon 12 | 36 | 0.5 |
| Comparative Example 3 | ETFE | N$_2$/VAc (7) | 45 | PP (160) | 29 | 0.2 | anate group, nitrile group, amino group, ether bond or polymerizable double bond.

6. The tubular laminate of claim 4, wherein the fluorine-containing resin is polytetrafluoroethylene, tetrafluoroethylene-perfluoroalkyl vinyl ether copolymer, tetrafluoroethylene-hexafluoropropylene copolymer, tetrafluoroethylene-ethylene copolymer, polychlorotrifluoroethylene or poly (vinylidene fluoride).

7. A tubular laminate comprising a tubular molded article of a fluorine-containing resin coated with a coating resin having a melting point lower than the fluorine-containing resin and a surface tension of not less that 30 dyn/cm, the laminate obtained by discharge-treating an outer surface of the tubular molded article in an inert gas atmosphere containing an organic compound having a functional group, and extruding the coating resin in a molten state onto the outer surface.

8. The tubular laminate of claim 7, wherein the functional group of the organic compound is hydroxyl group, epoxy group, carboxyl group, ester group, carbonyl group, isocyanate group, nitrile group, amino group, ether bond or polymerizable double bond.

9. The tubular laminate of claim 7, wherein the fluorine-containing resin is polytetrafluoroethylene, tetrafluoroethylene-perfluoroalkyl vinyl ether copolymer, tetrafluoroethylene-hexafluoropropylene copolymer, tetrafluoroethylene-ethylene copolymer, polychlorotrifluoroethylene or poly (vinylidene fluoride).

10. The process of claim 1, wherein the organic compound having a functional group is a member selected from the group consisting of monohydric alcohols, polyhydric alcohols, epoxydized compounds, carboxylic acids, dicarboxylic acids, esters, ketones, isocyanates, nitriles, acrylonitriles, melamines, diamines, acrylamides, amines, ammonium salts, vinyl ethers, diethyl ether, glycidyl methyl ether, and olefins.

11. The process of claim 1, wherein the organic compound having a functional group is a member selected from the group consisting of ethylene glycol, gricerol, methanol, ethanol, phenol, glycidyl methacrylate, epichlorohydrin, glycidyl ethers, epoxy alkanes, phtalic acid, maleic acid, acrylic acids, methacrylic acids, formic acid, acetic acid, methyl acrylate, methyl methacrylate, ethyl acrylate, glycidyl methacrylate, diallyl phthalate, ethyl formate, ethyl acetate, acetone, tolylenediisocyanate, acrylonitrile, methacrylonitrile, cyanoacrylates, acetonitrile, propionitrile, melamines, diamines, acrylamides, amines, ammonium salts, vinyl methyl ether, and vinyl ethyl ether, diethyl ether, glycidyl methyl ether, ethylene, propylene, vinyl acetate, chlorotrifluoroethylene, tetrafluoroethylene, and hexafluoropropylene.

12. The process of claim 1, wherein the molten resin is a member selected from the group consisting of polyamides and polyolefins.

13. The process of claim 1, wherein the molten resin is selected from the group consisting of nylon 12, nylon 11, nylon 6, and nylon 66, polyvinyl chloride, poly(vinyl acetate), poly(methyl methacrylate), polyacrylonitrile, polyethyleneterephthalate, and polyurethane.

14. The tubular laminate of claim 4, wherein the organic compound having a functional group is a member selected from the group consisting of monohydric alcohols, polyhydric alcohols, epoxydized compounds, carboxylic acids, dicarboxylic acids, esters, ketones, isocyanates, nitriles, acrylonitriles, melamines, diamines, acrylamides, amines, ammonium salts, vinyl ethers, diethyl ether, glycidyl methyl ether, and olefins.

15. The tubular laminate of claim 4, wherein the organic compound having a functional group is a member selected from the group consisting of ethylene glycol, gricerol, methanol, ethanol, phenol, glycidyl methacrylate, epichlorohydrin, glycidyl ethers, epoxy alkanes, phtalic acid, maleic acid, acrylic acids, methacrylic acids, formic acid, acetic acid, methyl acrylate, methyl methacrylate, ethyl acrylate, glycidyl methacrylate, diallyl phthalate, ethyl formate, ethyl acetate, acetone, tolylenediisocyanate, acrylonitrile, methacrylonitrile, cyanoacrylates, acetonitrile, propionitrile, melamines, diamines, acrylamides, amines, ammonium salts, vinyl methyl ether, and vinyl ethyl ether, diethyl ether, glycidyl methyl ether, ethylene, propylene, vinyl acetate, chlorotrifluoroethylene, tetrafluoroethylene, and hexafluoropropylene.

16. The tubular laminate of claim 4, wherein the molten resin is a member selected from the group consisting of polyamides and polyolefins.

17. The tubular laminate of claim 4, wherein the molten resin is selected from the group consisting of nylon 12, nylon 11, nylon 6, and nylon 66, polyvinyl chloride, poly (vinyl acetate), poly(methyl methacrylate), polyacrylonitrile, polyethyleneterephthalate, and polyurethane.

18. The tubular laminate of claim 7, wherein the organic compound having a functional group is a member selected from the group consisting of monohydric alcohols, polyhydric alcohols, epoxydized compounds, carboxylic acids, dicarboxylic acids, esters, ketones, isocyanates, nitriles, acrylonitriles, melamines, diamines, acrylamides, amines, ammonium salts, vinyl ethers, diethyl ether, glycidyl methyl ether, and olefins.

19. The tubular laminate of claim 7, wherein the organic compound having a functional group is a member selected from the group consisting of ethylene glycol, gricerol, methanol, ethanol, phenol, glycidyl methacrylate, epichlorohydrin, glycidyl ethers, epoxy alkanes, phtalic acid, maleic acid, acrylic acids, methacrylic acids, formic acid, acetic acid, methyl acrylate, methyl methacrylate, ethyl acrylate, glycidyl methacrylate, diallyl phthalate, ethyl formate, ethyl acetate, acetone, tolylenediisocyanate, acrylonitrile, methacrylonitrile, cyanoacrylates, acetonitrile, propionitrile, melamines, diamines, acrylamides, amines, ammonium salts, vinyl methyl ether, and vinyl ethyl ether, diethyl ether, glycidyl methyl ether, ethylene, propylene, vinyl acetate, chlorotrifluoroethylene, tetrafluoroethylene, and hexafluoropropylene.

20. The tubular laminate of claim 7, wherein the molten resin is selected from the group consisting of nylon 12, nylon 11, nylon 6, and nylon 66, polyvinyl chloride, poly (vinyl acetate), poly(methyl methacrylate), polyacrylonitrile, polyethyleneterephthalate, and polyurethane.

* * * * *